(12) United States Patent
Narayan et al.

(10) Patent No.: US 7,660,420 B1
(45) Date of Patent: Feb. 9, 2010

(54) WIRELESS DEVICE SYNCHRONIZATION

(75) Inventors: Anand Narayan, Milpitas, CA (US);
Steven B. Uhl, San Francisco, CA (US);
Salmaan Hameed, San Jose, CA (US)

(73) Assignee: Stryker Corporation, Kalamazoo, MI (US)

( * ) Notice: Subject to any disclaimer, the term of this patent is extended or adjusted under 35 U.S.C. 154(b) by 795 days.

(21) Appl. No.: 10/936,890

(22) Filed: Sep. 8, 2004

(51) Int. Cl.
*H04K 1/00* (2006.01)
*H04L 29/06* (2006.01)
*G06F 15/16* (2006.01)

(52) U.S. Cl. ............ 380/274; 713/160; 709/227; 709/245

(58) Field of Classification Search ............ 713/160; 380/274; 709/227, 245
See application file for complete search history.

(56) References Cited

U.S. PATENT DOCUMENTS

| | | | |
|---|---|---|---|
| 6,317,831 B1 * | 11/2001 | King | |
| 6,718,383 B1 * | 4/2004 | Hebert | |
| 6,891,810 B2 * | 5/2005 | Struhsaker et al. | |
| 7,184,435 B2 * | 2/2007 | Hsiao | 370/389 |
| 7,218,930 B2 * | 5/2007 | Ko et al. | 455/426.1 |
| 7,286,833 B2 * | 10/2007 | Friday et al. | |
| 2003/0115339 A1 * | 6/2003 | Hodoshima | |
| 2003/0200455 A1 * | 10/2003 | Wu | |
| 2004/0064591 A1 * | 4/2004 | Noble | 709/250 |
| 2004/0125778 A1 * | 7/2004 | Lin et al. | 370/338 |
| 2004/0131188 A1 * | 7/2004 | Wang et al. | |
| 2004/0213228 A1 * | 10/2004 | Tingle et al. | 370/389 |
| 2004/0221042 A1 * | 11/2004 | Meier | 709/227 |
| 2004/0253969 A1 * | 12/2004 | Nguyen et al. | 455/515 |
| 2005/0083949 A1 * | 4/2005 | Dobbins et al. | |
| 2005/0198267 A1 * | 9/2005 | Parks et al. | |
| 2005/0265286 A1 * | 12/2005 | Umemura | |
| 2005/0289347 A1 * | 12/2005 | Ovadia | |
| 2006/0020698 A1 * | 1/2006 | Whipple et al. | |
| 2006/0148483 A1 * | 7/2006 | Howard et al. | |

* cited by examiner

*Primary Examiner*—Michael Pyzocha
(74) *Attorney, Agent, or Firm*—Blakely, Sokoloff, Taylor & Zafman LLP (57) ABSTRACT

A system and method for wireless device synchronization is provided. A default connection is established between a first wireless device and a second wireless using default connection values. Unique address information is exchanged over the default connection. A unique connection is established between the first wireless device and the second wireless device.

24 Claims, 8 Drawing Sheets

WIRELESS DEVICE SYNCHRONIZATION

TECHNICAL FIELD

At least one aspect of the present invention pertains to establishing links between wireless communication devices and, more particularly, to establishing secure communication links automatically.

BACKGROUND

Endoscopy is a medical field in which internal features of the body of a patient are viewed without the use of traditional, fully-invasive surgery. Endoscopy is now widely used to perform minimally-invasive surgical procedures, such as arthroscopy and laparoscopy. A basic endoscopy tool is the endoscopic camera system. An endoscopic camera system generally includes a scope that is inserted into the body of a patient, a camera that is optically and physically coupled to the scope, and a high intensity light source that is normally coupled to the scope by a fiber optic cable to introduce light into the body. Images acquired by the camera are typically displayed on a conventional video monitor.

The camera is normally coupled through a flexible transmission line to a camera control unit (CCU), which in turn is coupled to a base unit. The CCU processes video data provided by the camera head to generate images, which are coupled through the base unit and displayed on a video monitor. The base unit may also be coupled to various multimedia and surgical devices. Multimedia devices may include a printer, a video-cassette recorder (VCR) and an image capture device (ICD). Surgical devices may include, for example, insufflators and arthro-pumps, or other devices. Each of these devices must be monitored and controlled during a surgical procedure.

The equipment may be controlled, at least in part, and at the surgeon's direction, by a nurse or surgical assistant through the use of a wireless device that communicates with the base unit. However, a single operating room may have multiple base units and multiple wireless devices, either because there is more than one control system in operation, or for backup in case of equipment malfunction. To avoid signal interference and device contention between the wireless devices, it is desirable that each wireless device have a unique association with only one base unit at a time. Furthermore, it is desirable that the wireless devices have the ability to re-associate with a different base unit and that base units have the ability to re-associate with a different wireless device. Furthermore, it would be desirable if the association process were automatic, requiring no data input from the user.

SUMMARY OF AN EMBODIMENT OF THE INVENTION

In one aspect of the present invention, a method is provided which includes establishing a default connection between a first device having a first address and a second device having a second address, wherein the default connection is a first secure connection; exchanging information between the first device and the second device; and establishing a unique connection between the first device and the second device, wherein the unique connection is a second secure connection. Other aspects of the invention include an apparatus and a system that can perform such a method.

Other features of the present invention will be apparent from the accompanying drawings and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention.

The present invention includes operations, which will be described below. The operations of the present invention may be embodied in machine-executable instructions, which may be used to cause a general-purpose or special-purpose processor programmed with the instructions to perform the operations. Alternatively, the operations may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine readable medium may include, but is not limited to: magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; electrical, optical, acoustical or other form of propagated signal; (e.g., carrier waves, infrared signals, digital signals, etc.); or other type of medium suitable for storing electronic instructions.

The present invention may also be practiced in distributed computing environments where the machine-readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A system for the synchronization of wireless devices is described. In one embodiment, and as described in greater detail below, the system includes a base unit having a wireless interface, slave devices connected to the base unit, and a wireless control unit (WCU). The base unit controls the slave units in response to commands from the WCU. The base unit also receives device status information from the slave devices, which it sends to the WCU in response to requests from the WCU. The base unit, the slave devices and the WCU form at least part of a network on which each has an assigned address to facilitate the routing of data and commands.

Figure 1:
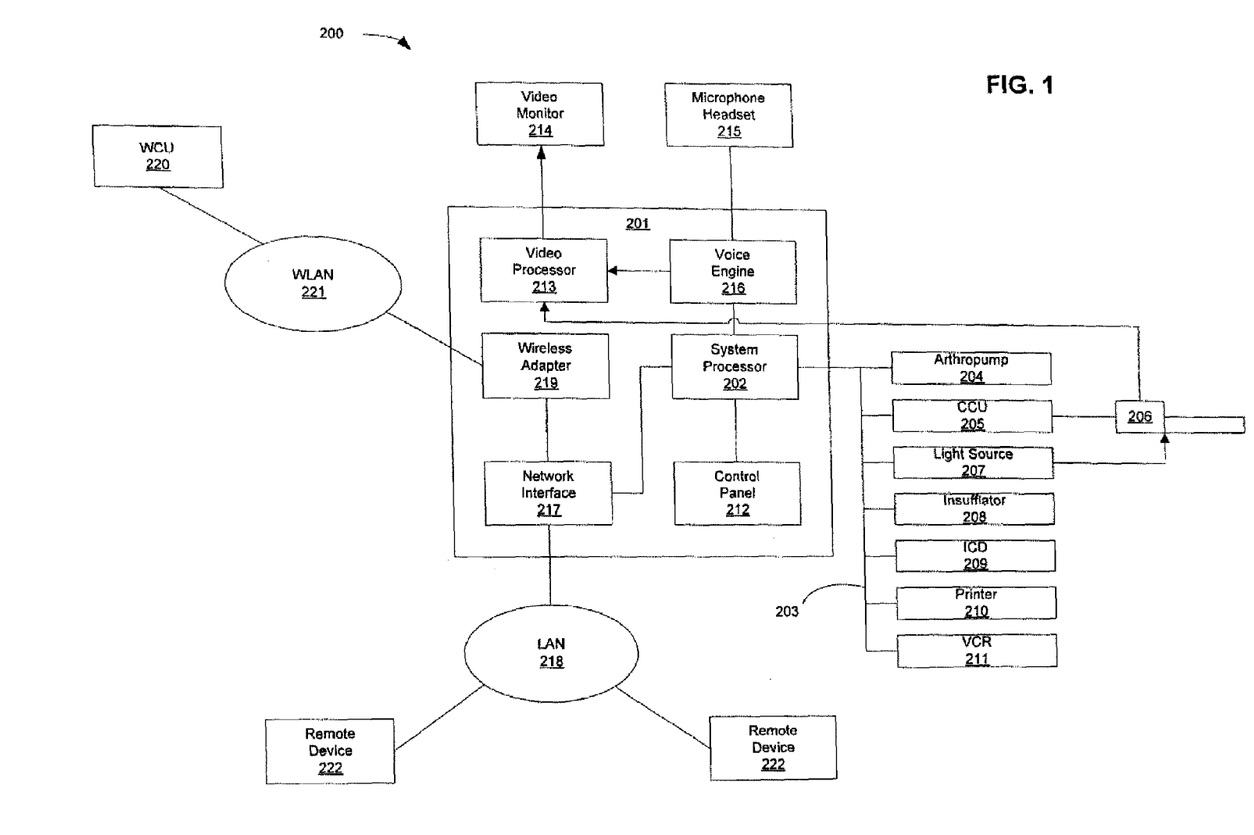
FIG. 1 illustrates an endoscopic control system in one embodiment of wireless device synchronization.

FIG. 1 illustrates an endoscopic control system 200 in one embodiment of wireless device synchronization. System 200 may include a base unit 201. Base unit 201 may include system processor 202 which may be connected to slave devices on a bus 203. Bus 203 may be a serial bus, a parallel bus or any type of bus capable of interconnecting devices. Slave devices may include arthro-pump 204, camera control unit (CCU) 205, endoscopic camera 206, light source 207, insufflator 208, image capture device (ICD) 209, printer 210 and video recorder (VR) 211. System processor 202 may be connected to control panel 212, which may be an LCD touchscreen control panel that provides local control of the slave devices that are connected to system processor 202. In one embodiment, slave devices such as slave devices 204-211 may be connected to system processor 202 on a wired local area network (LAN) such as, for example, an Ethernet network, a token-ring network or any other type of wired network. In another embodiment, slave devices such as slave devices 204-211 may be connected to base unit 201 on a wireless LAN (WLAN) such as, for example, an 802.11b wireless Ethernet LAN, a Bluetooth Personal Device Network (PDN), or any other type of wireless network. Video images from camera 206 may be processed by video processor 213 for display on video monitor 214. The video images may be overlaid with data and graphics pertaining to the status of slave devices 204-211 in response to voice commands issued at microphone headset 215 and processed through voice engine 216. System processor 202 may receive device control commands from voice engine 216 in response to voice commands entered at microphone headset 215. System processor 202 may control slave devices 204-211 in response to device control commands from voice engine 216. System processor 202 may also be connected to network interface 217 which may in turn be connected to LAN 218. LAN 218 may be, for example, a wired Ethernet LAN, a wireless LAN such as an 802.11b LAN, a Bluetooth Personal Device Network, etc. LAN 218 may provide access to remote devices 222. The remote devices 222 may be conventional computers or workstations as are known in the art. Alternatively, remote devices 222 may be any other type of network device such as a file server, router, etc. System processor 202 may also be connected through network adapter 217, or directly, to wireless adapter 219. Wireless adapter 219 may be, for example, a conventional wireless adapter such as an 802.11b wireless Ethernet adapter, a Bluetooth adapter, or any other wireless adapter. Wireless adapter 219 may provide a communication link to WCU 220 through WLAN 221.

In one embodiment, WCU 220 may be a wireless computer having a graphical user interface (GUI) that may be used to control the base unit 201 and display the status of slave devices, such as slave devices 204-211. Alternatively, WCU 220 may be another type of wireless device such as a personal digital assistant (PDA), wireless equipped laptop or desktop computer, Blackberry device, Bluetooth device, WiFi (wireless fidelity) equipped cellular phone, wireless headset microphone or any other wireless device which is compatible with wireless adapter 219. Accordingly, WLAN 221 may be an 802.11b wireless Ethernet LAN, Bluetooth PDN, or any other WLAN that is compatible with wireless adapter 219 and WCU 220. WLAN 221 may conform to a conventional Internet protocol, such as TCP/IP (transmission control protocol/Internet protocol), and may support VoIP (voice over Internet protocol) or any other data transmission protocol.

As described in greater detail below, wireless devices such as WCU 220 and wireless adapter 219 in base unit 201, may use an encryption code to encrypt and decrypt data transmissions, and may also use a network identifier to associate with a particular network. Wireless devices so configured may only communicate with another wireless device that uses the same encryption key and the same network identifier. An example of a network identifier is the Service Set Identifier (SSID) utilized in wireless Ethernet networks conforming to the EEE 802.11b standard, for example. A network identifier may be, for example, an alphanumeric identifier encoded as a string of hexadecimal characters stored in binary code. An example of an encryption code is a Wired Equivalent Privacy (WEP) code, which is also used in some wireless Ethernet networks. An encryption code is used in a hashing algorithm to generate an encryption key that that is used to encrypt data. For example, the WEP standard uses a 26 character hexadecimal code to generate a 128-bit encryption key.

Figure 2:
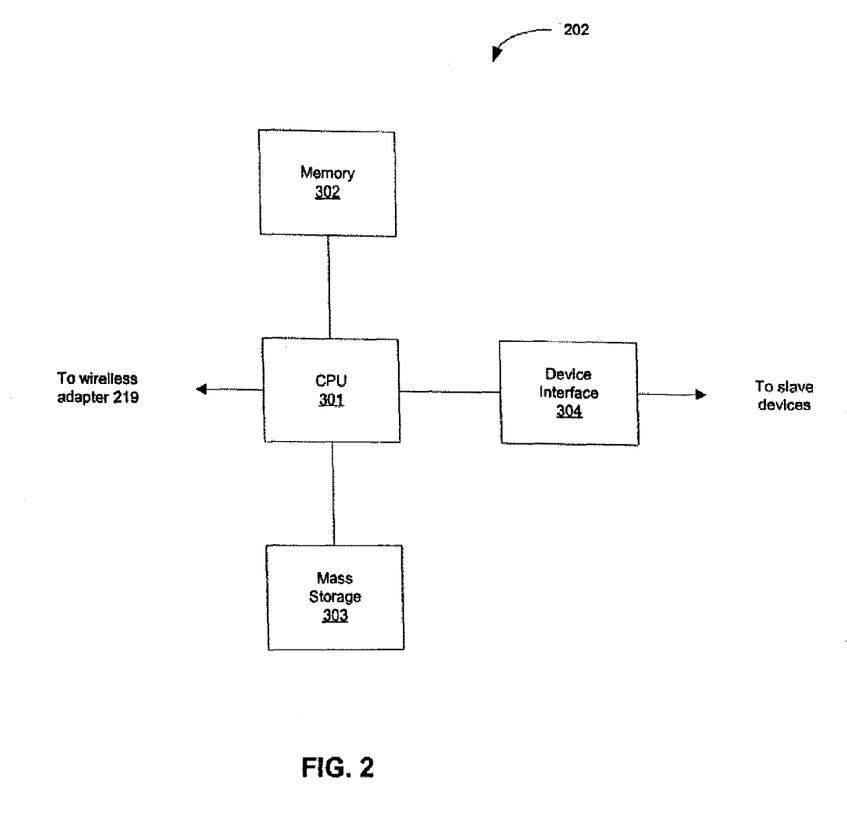
FIG. 2 illustrates a block diagram of a system processor according to one embodiment of wireless device synchronization.

FIG. 2 illustrates a block diagram of system processor 202 in one embodiment. As shown in FIG. 2, system processor 202 includes a central processing unit (CPU) 301. CPU 301 may be a general-purpose processor such as an Intel Pentium processor, a Motorola Power PC processor or similar general-purpose processors. Alternatively, CPU 301 may be a special purpose processor such as a field programmable gate array (FPGA), an application specific integrated circuit (ASIC) or a digital signal processor (DSP). CPU 301 may be coupled to a system memory 302, a mass storage device 303, and device interface 304. System memory 302 may be used for storage of software instructions and related data. System memory 302 may include volatile memory, non-volatile memory or both. Any such volatile memory may be, for example, any type of random access memory (RAM) such as static RAM (SRAM) or dynamic RAM (DRAM). Any such non-volatile memory may be, for example, any type of read only memory (ROM) such as electronically programmable ROM (EPROM) or flash memory, etc. Mass storage device 303 may be used for permanent storage of programs and data and may be any type of non-volatile storage medium such as a magnetic hard drive, floppy disk, a read-write CD-ROM or DVD, flash memory, etc. Device interface 304 may be used to interface with and control slave devices such as slave devices 204-211. Device interface 304 may be, for example, a universal serial interface that may be compatible with EIA (Electronic Industries Association) serial interface standard 232, IEEE (Institute of Electrical and Electronic Engineers) serial interface standard 1394, or USB (Universal Serial Bus) standards. Device interface 304 may also be a wireless adapter such as wireless adapter 219 described above. System processor 202 may also be connected to a system bus (not shown) to communicate with other components of the base unit 201.

Figure 3:
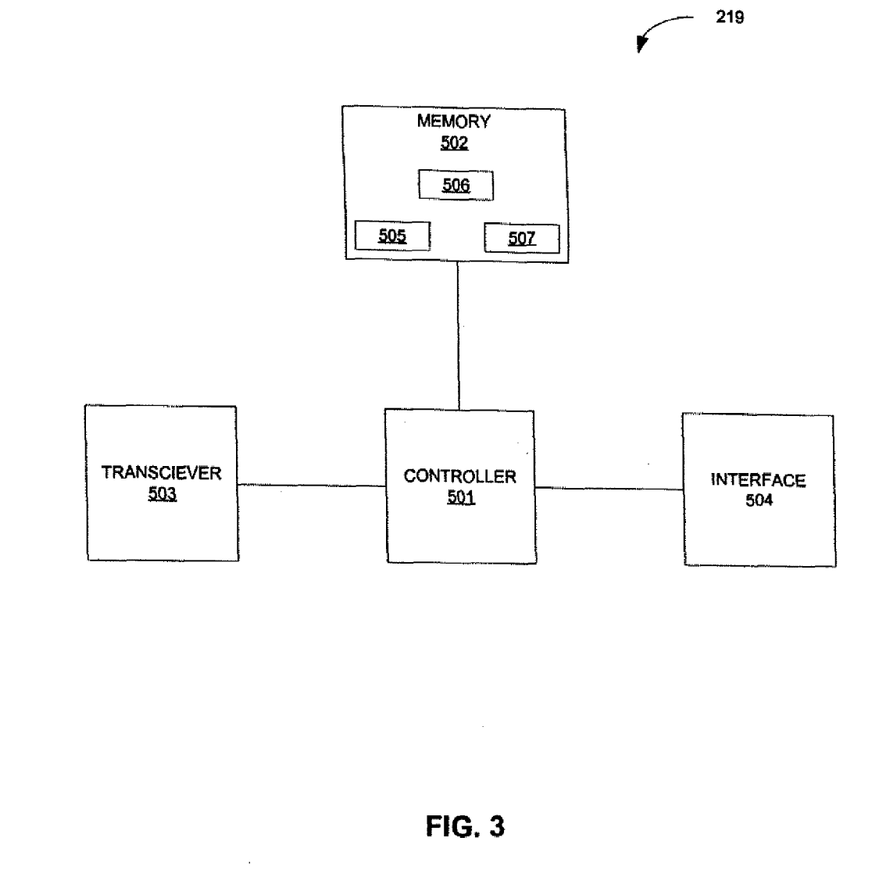
FIG. 3 illustrates a wireless adapter according to one embodiment of wireless device synchronization.

FIG. 3 illustrates a block diagram of wireless adapter 219 in one embodiment. As shown in FIG. 3, wireless adapter 219 includes a controller 501. Controller 501 may be a general-purpose controller as described above, or a special purpose controller such as a field programmable gate array (FPGA), an application specific integrated circuit (ASIC) or a digital signal processor (DSP). Controller 501 may be coupled to memory 502, interface 504, and transceiver 503. Memory 502 may be used for storage of software instructions and related data. Memory 502 may include volatile memory, non-volatile memory, or both. Any such volatile memory may be, for example, any type of random access memory (RAM) such as static RAM (SRAM) or dynamic RAM (DRAM). Any such non-volatile memory may be, for example, any type of read only memory (ROM) such as electronically programmable ROM (EPROM) or flash memory, etc. Memory 502 may have stored therein an address 505, which may be an address identifying wireless adapter 219. Address 505 may be stored as a string encoding a sequence of characters or values. In one embodiment, address 505 may be a hardware address that uniquely identifies wireless adapter 219. In one embodiment, address 505 may be a media access control (MAC) address. Memory 502 may also have stored therein an encryption code 507. Encryption code 507 may be a programmable code, stored as a string encoding a sequence of characters or values. In one embodiment, encryption code 507 may be a wired equivalent privacy (WEP) code, which may be used in an encryption algorithm to encrypt data that is transmitted by transceiver 503 and to decrypt encrypted data that is received by transceiver 503. Memory 502 may also have stored therein a network identifier 506. Network identifier 506 may be a programmable code, stored as a string encoding a sequence of characters or values, which identifies a wireless LAN such as WLAN 221. In one embodiment, network identifier 506 may be a service set identifier (SSID) that may identify a wireless Ethernet network. Interface 504 may couple controller 501 with network interface 217. Interface 504 may be, for example, a universal serial interface that may be compatible with EIA (Electronic Industries Association) serial interface standard 232, IEEE (Institute of Electrical and Electronic Engineers) serial interface standard 1394, or USB (Universal Serial Bus) standards. Transceiver 503 may be a conventional wireless transceiver, known in the art, which transmits and receives data that is subsequently processed, for example, by controller 501 or system processor 202.

Figure 4:
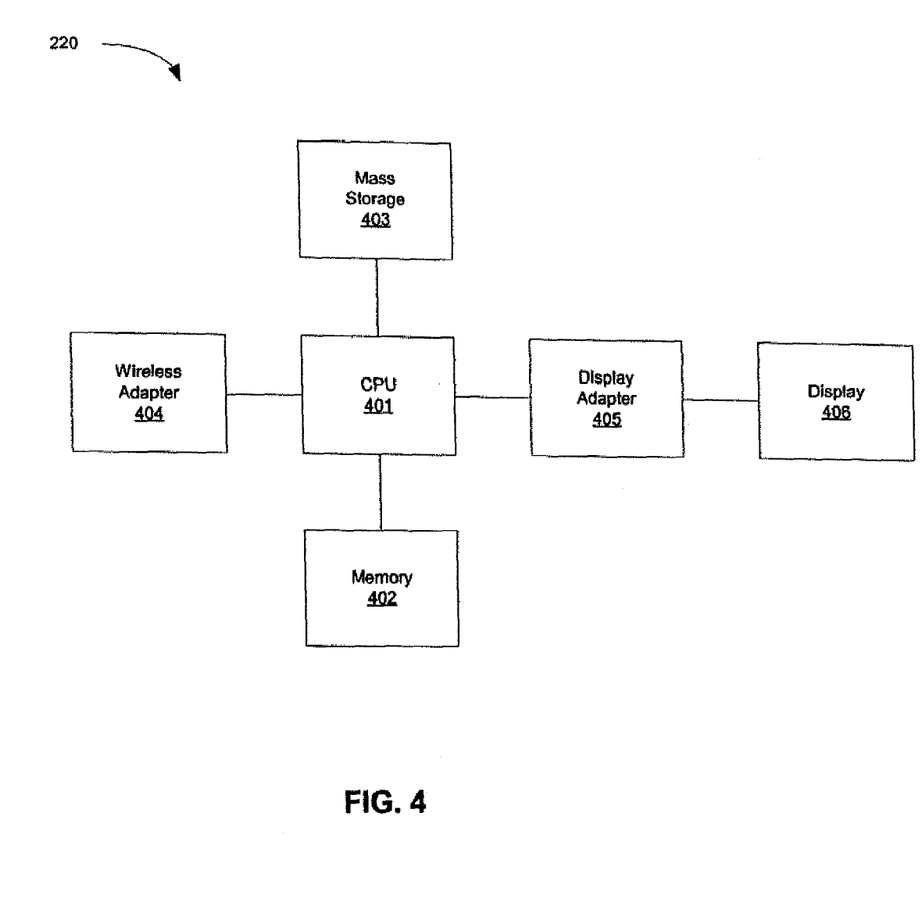
FIG. 4 illustrates a wireless control unit according to one embodiment of wireless device synchronization.

FIG. 4 illustrates a block diagram of wireless control unit (WCU) 220 in one embodiment. As shown, WCU 220 includes a central processing unit (CPU) 401. CPU 401 may be a general-purpose processor as described above, or a special purpose processor such as a field programmable gate array (FPGA), an application specific integrated circuit (ASIC) or a digital signal processor (DSP). CPU 401 may be coupled to a memory 402, a mass storage device 403, a wireless adapter 404 and a display adapter 405. Memory 402 may be used for storage of software instructions and related data. Memory 402 may include volatile memory, non-volatile memory or both. Any such volatile memory may be, for example, any type of random access memory (RAM) such as static RAM (SRAM) or dynamic RAM (DRAM). Any such non-volatile memory may be, for example, any type of read only memory (ROM) such as electronically programmable ROM (EPROM) or flash memory, etc. Mass storage device 403 may be used for permanent storage of programs and data and may be any type of non-volatile storage medium such as a magnetic hard drive, floppy disk, flash memory, etc. Display adapter 405 may couple the CPU 401 with display 406. Display 406 may be an LCD touch-screen display. Accordingly, display adapter 405 may include touch-screen sensors (not shown). Wireless adapter 404 may be, for example, a conventional wireless adapter such as an 802.11b wireless Ethernet adapter, a Bluetooth adapter, or similar wireless adapter. Wireless adapter 404 may provide a communication link to base unit 201 through wireless LAN (WLAN) 221.

Figure 5:
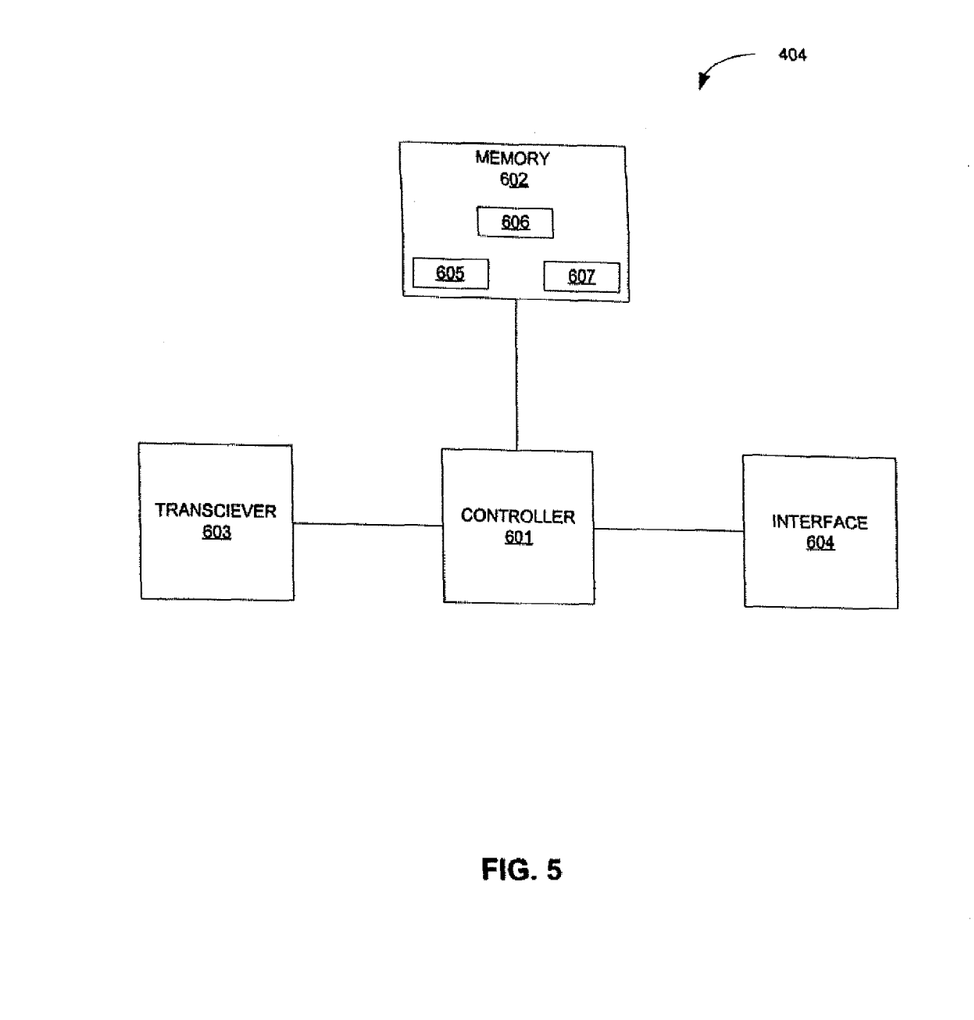
FIG. 5 illustrates another wireless adapter according to one embodiment of wireless device synchronization.

FIG. 5 illustrates a block diagram of wireless adapter 404 in one embodiment. As shown in FIG. 5, wireless adapter 404 includes a controller 601. Controller 601 may be a general-purpose controller as described above, or a special purpose controller such as a field programmable gate array (FPGA), an application specific integrated circuit (ASIC) or a digital signal processor (DSP). Controller 601 may be coupled to memory 602, interface 604, and transceiver 603. Memory 602 may be used for storage of software instructions and related data. Memory 602 may include volatile memory, non-volatile memory or both. Any such volatile memory may be, for example, any type of random access memory (RAM) such as static RAM (SRAM) or dynamic RAM (DRAM). Any such non-volatile memory may be, for example, any type of read only memory (ROM) such as electronically programmable ROM (EPROM) or flash memory, etc.

Memory 602 may have stored therein an address 605, which may be an address identifying wireless adapter 404. Address 605 may be stored as a string encoding a sequence of characters or values. In one embodiment, address 605 may be a hardware address that uniquely identifies wireless adapter 404. In one embodiment, address 605 may be a media access control (MAC) address.

Memory 602 may also have stored therein an encryption code 607. Encryption code 607 may be a programmable code, stored as a string encoding a sequence of characters or values. In one embodiment, encryption code 606 may be a wired equivalent privacy (WEP) code, which may be used in an encryption algorithm to encrypt data that is transmitted by transceiver 603 and to decrypt encrypted data that is received by transceiver 603. Memory 602 may also have stored therein a network identifier 606. Network identifier 606 may be a programmable code, stored as a string encoding a sequence of characters or values, which identifies a wireless LAN such as WLAN 221. In one embodiment, network identifier 606 may be a service set identifier (SSID), which may identify a wireless Ethernet network, for example. In one embodiment, wireless adapter 404 maybe configured to communicate with another wireless adapter, such as wireless adapter 219 for example, only if the other adapter shares the same Interface 604 may couple controller 601 with CPU 401. Interface 604 may be, for example, a universal serial interface that may be compatible with EIA (Electronic Industries Association) serial interface standard 232, IEEE (Institute of Electrical and Electronic Engineers) serial interface standard 1394, or USB (Universal Serial Bus) standards. Transceiver 603 may be a conventional wireless transceiver, known in the art, which transmits and receives data that is subsequently processed, for example, by controller 601 or CPU 401.

Some features of system processor 202 and WCU 220 may be implemented in software, at least in part. The software may be executed as appropriate by CPU 301 and CPU 401 or by other components such as wireless adapters 219 and 404, for example.

Figure 6:
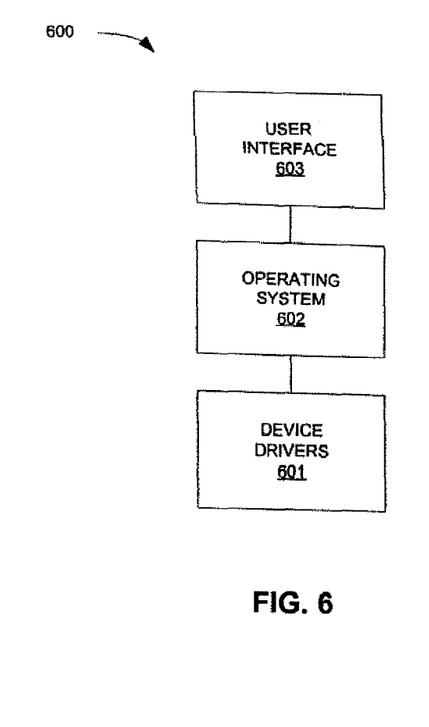
FIG. 6 illustrates a software architecture of a base unit in one embodiment of wireless device synchronization.

FIG. 6 shows the overall software configuration of the system processor 202. As shown in FIG. 6, the software 600 associated with the system processor 202 includes 3 major components: a device driver layer 601, an operating system 602, and a user interface. In one embodiment, the operating system 602 may be a conventional operating system, such as Microsoft Windows 2000, Windows XP or a custom embedded operating system based on Windows XP Embedded, for example. The device driver layer 601 provides an interface between the operating system 602 and the hardware components (see FIG. 2) of the system processor 202. The software 600 in the system processor 202 may be stored at least partially in memory 302 (FIG. 3). The software may also be stored at least partially in mass storage device 303. In one embodiment, operating system 602 may implement a filing system such as a Microsoft Windows NT filing system or any other type of filing system which implements file and folder sharing. Operating system 602 may also implement a file transfer protocol (FTP) for file sharing. User interface 603 may provide mechanisms for human interaction with the base unit 201 by, for example, a touch-screen graphical user interface (GUI) or keyboard or mouse inputs.

Figure 7:
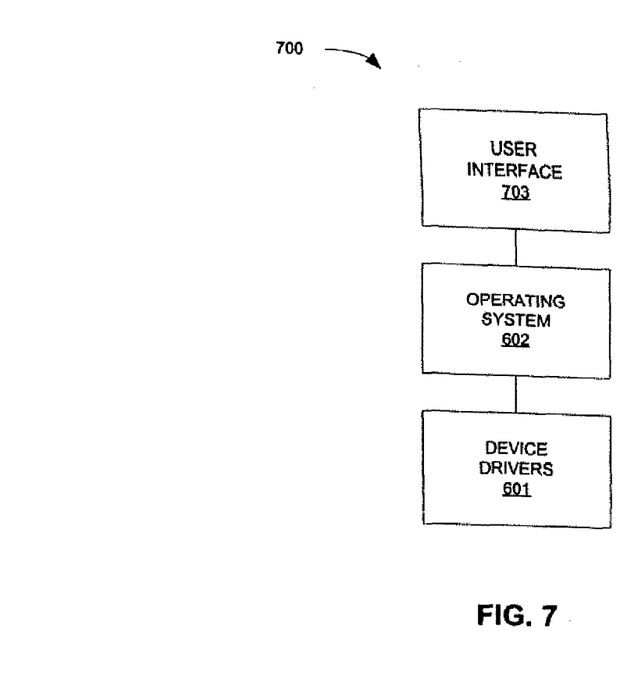
FIG. 7 illustrates a software architecture of a wireless control unit in one embodiment of wireless device synchronization.

FIG. 7 shows the overall software configuration of WCU 220. As shown in FIG. 7, the software 700 associated with the system WCU 220 also includes 3 major components: a device driver layer 701, an operating system 702, and a user interface 703. In one embodiment, the operating system 702 may be a conventional operating system, such as Microsoft Windows CE, Windows 2000, Windows XP or a custom embedded operating system based on Windows XP Embedded, for example. The device driver layer 701 provides an interface between the operating system 702 and the hardware components (see FIG. 4) of the WCU 220. The software 700 in the system WCU 220 may be stored at least partially in memory 402. The software may also be stored at least partially in mass storage device 403. In one embodiment, operating system 702 may implement a filing system such as a Microsoft Windows NT filing system or any other type of filing system which implements file and folder sharing. Operating system 702 may also implement a file transfer protocol (FTP) for file sharing. User interface 703 may provide mechanisms for human interaction with the WCU 220 by, for example, a touch-screen graphical user interface (GUI) or keyboard or mouse inputs.

Figure 8:
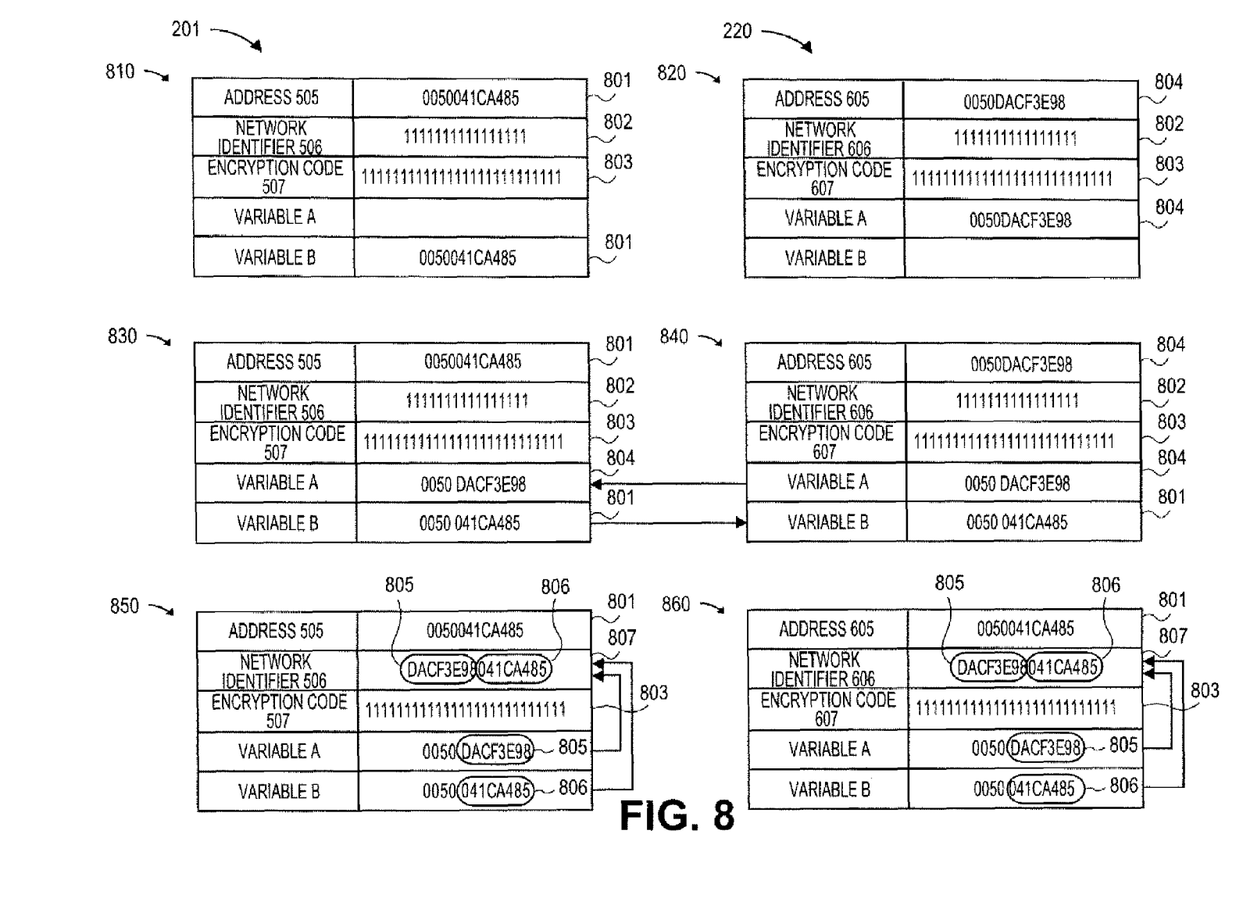
FIG. 8 illustrates a state diagram for one embodiment of wireless device synchronization.

In one embodiment of a method of wireless device synchronization, as shown in FIG. 8, addresses 505 and 605, encryption codes 506 and 606, and network identifiers 507 and 607 may be used to establish a unique association (synchronization) between base unit 201 and WCU 220. FIG. 8 illustrates a sequence of states of base unit 201 and WCU 220.

In state 810, an initial state, base unit 201 may have a unique hardware address 505 (e.g., a hardware address identifying wireless adapter 219) stored in memory 502 where, for example, the stored value is a 12 character hexadecimal MAC address 801 as shown. Hardware address 505 may, however, be any hardware address that identifies the base unit 201. Base unit 201 may have a default network identifier 506 stored in memory 502, which may be, for example, a string 802 of 16 hexadecimal 1's as shown, representing a default SSID, for example. Base unit 201 may also have a default encryption code 507 stored in memory 502, which may be, for example, a string 803 of 26 hexadecimal 1's as shown, representing a default WEP encryption code, for example. String 802 and string 803 may be any combination of characters and any length that is supported by the WLAN protocol in use (e.g., wireless Ethernet, Bluetooth, etc.)

In state 820, an initial state, WCU 220 may have a unique hardware address 605 (e.g., a hardware address identifying wireless adapter 404) stored in memory 602 where, for example, the stored value is a 12 character hexadecimal MAC address 804 as shown. Hardware address 605 may, however, be any hardware address which identifies the WCU 220. WCU 220 may have a default network identifier 606 stored in memory 602, which may be, for example, the string 802 of 16 hexadecimal 1's as shown, representing the default SSID. Base unit 201 may also have a default encryption code 607 stored in memory 602 which may be, for example, the string 803 of 26 hexadecimal 1's corresponding to the default WEP encryption code. As noted above, string 802 and string 803 may be any combination of characters and any length that is supported by the WLAN protocol in use (e.g., wireless Ethernet, Bluetooth, etc.). Thus, base unit 201 and WCU 220 may have default configurations wherein they have common stored values 802 of network identifiers and common stored values 803 of encryption codes. Therefore, base unit 201 and WCU 220 may be capable of establishing a communications link over WLAN 221 as described earlier.

In state 810, base unit 201 may have two local files, created by operating system 602, which may be named VARIABLE A and VARIABLE B, for example. VARIABLE A may be a null file and VARIABLE B may contain a copy 801 of address 505. Similarly, in state 820, WCU 220 may have two local files, created by operating system 702, which may also be named VARIABLE A and VARIABLE B. VARIABLE B may be a null file and VARIABLE A may contain a copy 804 of address 605.

In state 830, base unit 201 may establish communication with WCU 220 and may send a copy 801 of VARIABLE B to WCU 220, where it is stored in local file VARIABLE B. In state 840, WCU may establish communication with base unit 201 and may send a copy 804 of VARIABLE A to base unit 201 where it is stored in local file VARIABLE A.

In state 850, base unit 201 may copy a portion 805 of VARIABLE A to network identifier 506, and base unit 201 may copy a portion 806 of VARIABLE B to network identifier 506 so as to overwrite the default network identifier 802 with a new network identifier 807 comprising the portion 805 of VARIABLE A and the portion 806 of VARIABLE B. In the example shown in FIG. 8, the last eight characters of VARIABLE A and the last eight characters of VARIABLE B are used to form the new network identifier 807. However, the method may be practiced with any greater or lesser portions 805 and 806 of VARIABLE A and VARIABLE B which yield a new network identifier 807 which is compatible with the WLAN format in use.

In state 860, WCU 220 may copy the portion 805 of VARIABLE A to network identifier 606, and WCU 220 may copy the portion 806 of VARIABLE B to network identifier 606 so as to overwrite the default network identifier 802 with the new network identifier 807 comprising the portion 805 of VARIABLE A and the portion 806 of VARIABLE B. As noted above, greater or lesser portions of VARIABLE A and VARIABLE B may be used to form new network identifier 807, depending on the requirements of the WLAN protocol in use.

Thereafter, base unit 201 and WCU 220 may establish a new wireless communication link on WLAN 221 because they share default encryption code 803 and the network identifier 807 which may be a unique network identifier.

Figure 9:
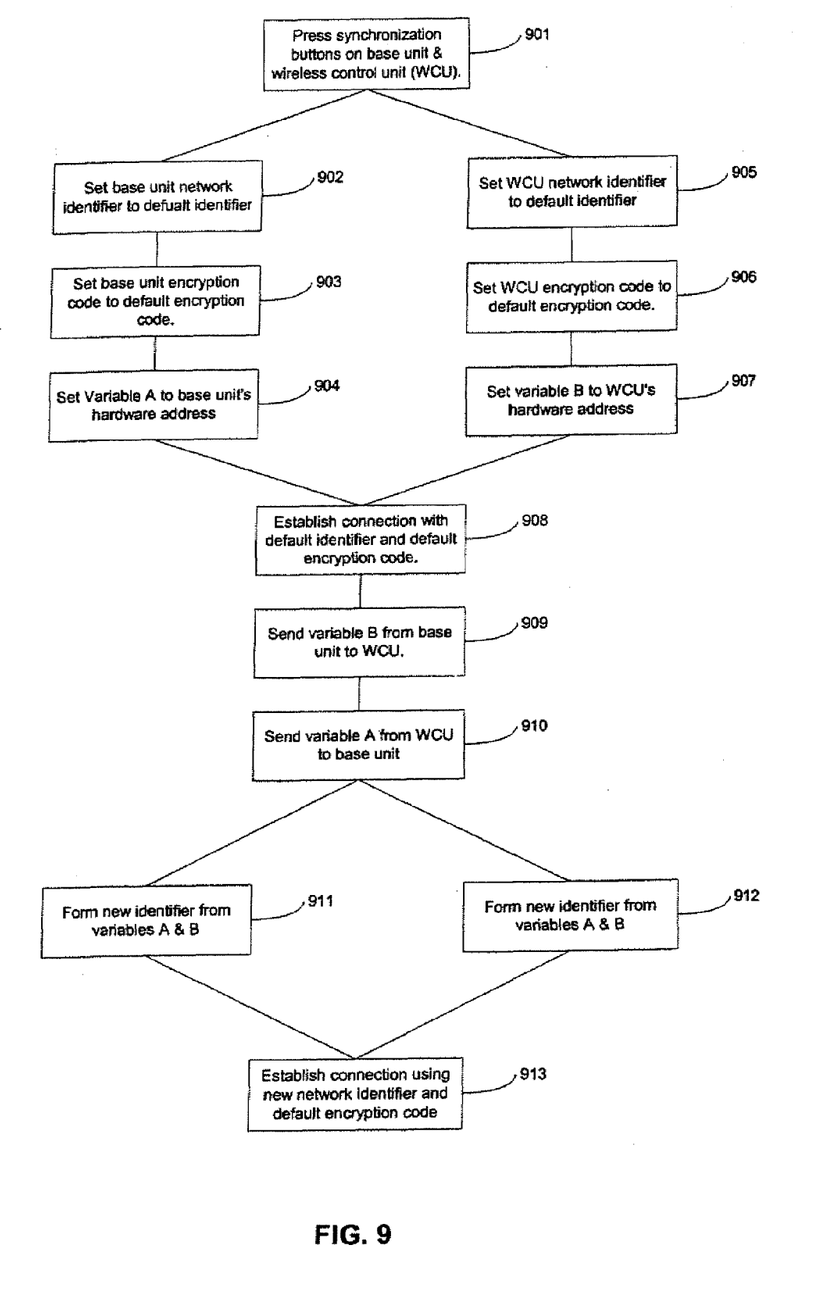
FIG. 9 illustrates one embodiment of a method for wireless device synchronization.

FIG. 9 illustrates another embodiment of a method for wireless device synchronization. The method begins at operation 901 when synchronization buttons on the base unit 201 and the wireless control unit (WCU) 220 are activated within a specified time window (e.g., both buttons pressed within a 2 second period). If base unit 201 does not detect an attempted wireless negotiation within the specified time period, base unit 201 will revert to its previous state, whether the state was synchronized or unsynchronized. Similarly, if WCU 220 does not detect an attempted wireless negotiation within the specified time period, WCU 220 will revert to its previous state, whether the state was synchronized or unsynchronized. It will be appreciated that the two-button time window may be used to prevent inadvertent synchronizations or de-synchronizations from a single button press. Next, network identifier 506 in base unit 201 is set to default network identifier 802, operation 902. Encryption code 507 in base unit 201 is set to default encryption code 803, operation 903. Variable A in base unit 201 is set to hardware address 801, operation 904. At operation 905, network identifier 605 in WCU 220 is set to default network identifier 802. Encryption code 606 in WCU 220 is set to default encryption code 803, operation 906. Variable B in WCU 220 is set to hardware address 804, operation 907.

At operation 908, the base unit 201 and the WCU 220 establish a connection using the default network identifier 802 and the default encryption code 803. WCU 220 and/or base unit 201 may be programmed to wait for a predetermined time while the connection is established. The connection may be established, for example, by executing an automatic configuration utility such as Microsoft's Zero Configuration Utility or a similar utility available from wireless adapter manufacturers. Alternatively, the connection may be configured using a custom configuration utility. If the connection is not established within the predetermined period, base unit 201 and WCU 220 may return to their previous synchronized if they were previously synchronized with each other or with any other wireless device. If the connection is established within the predetermined period, then base unit 201 and WCU 220 will be de-synchronized from any prior existing synchronization. In operation 909, base unit 201 sends variable A to WCU 220. In operation 910, WCU 220 sends variable B to base unit 201. In operation 911, base unit 201 overwrites default network identifier 802 with a portion 805 of variable A and a portion 806 of variable B to form a new network identifier 807. In operation 912, WCU 220 overwrites default network identifier 802 with the portion 805 of variable A and the portion 806 of variable B to form the new network identifier 807. In operation 913, a new connection is established between base unit 201 and WCU 220 using the default encryption code 803 and the new network identifier 807. WCU 220 and/or base unit 201 may be programmed to wait for a predetermined time while the connection is established, as described above. After the connection is established, WCU 220 may continuously monitor the connection by pinging the base unit 201. If the pinging operation produces a number of consecutive error codes (e.g., 10 consecutive error codes), the WCU 220 may disable the connection and then re-enable the connection using new network identifier 807 and the default encryption code 803. If the attempt to re-enable the connection fails, the WCU 220 and the base unit 201 may be programmed to revert to the default connection and re-attempt the synchronization.

Thus, an apparatus, system and method for wireless device synchronization have been described. It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method comprising:
    establishing a default connection between a first device having a first address and a second device having a second address, wherein the default connection is a first secure connection;
    exchanging identifying information between the first device and the second device; and
    establishing a unique connection between the first device and the second device, wherein the unique connection is a second secure connection, and wherein establishing a unique connection between the first device and the second device comprises
        forming a network identifier in the first device from a portion of the first address and a portion of the second address, wherein both the portion of the first address and the portion of the second address are not null;
        forming the network identifier in the second device from the portion of the first address and the portion of the second address;
        establishing a second connection between the first device and the second device wherein the second connection uses the network identifier as a second connection identifier and uses a common string as a second connection encryption code.

2. The method of claim 1 wherein establishing the default connection between the first device and the second device comprises:
    in the first device;
        setting a first identifier to a first string,
        setting a first encryption code to a second string, and
    in the second device;
        setting a second identifier to the first string,
        setting a second encryption code to the second string, and
    establishing a first connection between the first device and the second device wherein the first connection uses the first string as a first connection identifier and uses the second string as a first connection encryption code.

3. The method of claim 1 wherein exchanging identifying information between the first device and the second device comprises:
    transferring the first address from the first device to the second device; and
    transferring the second address from the second device to the first device.

4. The method of claim 1 wherein the first device and the second device are wireless devices.

5. The method of claim 1 wherein the first address and the second address are hardware addresses.

6. The method of claim 1 wherein the first address and the second address are MAC addresses.

7. The method of claim 1 wherein the first address is stored in a first file and the second address is stored in a second file, and wherein the first address and the second address are transferred with at least one of a file transfer protocol, a hypertext transfer protocol, and a file sharing protocol.

8. The method of claim 1 further comprising breaking the default connection before establishing the unique connection.

9. The method of claim 1 wherein at least one of the first device and the second device is one of a wireless headset, a tablet computer, a laptop computer, and a personal digital assistant.

10. The method of claim 1 wherein one of the first device and the second device is an endoscopic control device.

11. The method of claim 1 wherein the default connection and the unique connection are TCP/IP connections.

12. An apparatus comprising:
a memory;
a network adapter, the network adapter having a first address; and
a processor coupled with the memory and the network adapter, the processor, in response to a user input, to set a first identifier to a first string, to set a first encryption code to a second string, and to read the first address, the processor to establish a first connection with a network device wherein the first connection uses the first string as a first connection identifier and uses the second string as a first connection encryption code, the processor to send the first address to the network device and to receive a second address from the network device, wherein the processor forms a third identifier from a portion of the first address and a portion of the second address, wherein both the portion of the first address and the portion of the second address are not null, and wherein the processor establishes a second connection with the network device, wherein the second connection uses the third identifier as a second connection identifier and uses the second string as a second connection encryption code.

13. The apparatus of claim 12 wherein the network adapter is a wireless network adapter and the network device is a wireless network device.

14. The apparatus of claim 12 wherein the first address and the second address are hardware addresses.

15. The apparatus of claim 12 wherein the first address and the second address are MAC addresses.

16. The apparatus of claim 12 wherein the network device is an endoscopic control device.

17. A system comprising:
a first device comprising:
a first memory;
a network adapter, the network adapter having a first address;
a first processor coupled with the memory and the network adapter, the first processor configured, in response to a user input, to set a first identifier to a first string, to set a first encryption code to a second string, and to store the first address in the first memory; and
a second device comprising:
a second memory;
a network interface having a second address;
a second processor coupled with the second memory and the network interface, the second processor configured, in response to a user input, to set a second identifier to the first string, to set a second encryption code to the second string, and to store the second address in the second memory; wherein
the first processor and the second processor are configured to establish a first connection between the first device and the second device wherein the first connection uses the first string as a first connection identifier and uses the second string as a first connection encryption code, wherein the first address is transferred from the first device to the second device and the second address is transferred from the second device to the first device, wherein a third identifier is formed in the first device and in the second device from a portion of the first address and a portion of the second address, wherein both the portion of the first address and the portion of the second address are not null, and wherein
the first processor and the second processor are further configured to establish a second connection between the first device and the second device wherein the second connection uses the third identifier as a second connection identifier and the second string as a second connection encryption code.

18. The system of claim 17 wherein the network adapter is a wireless network adapter and the network interface is a wireless network interface.

19. The system of claim 17 wherein the first address is stored in a first file in the first memory and the second address is stored in a second file in the second memory, and wherein the first address and the second address are transferred by transferring the first file and the second file with one of a file transfer protocol, a filing sharing protocol and a hypertext transfer protocol.

20. The system of claim 17 wherein the second device is an endoscopic control device.

21. A machine-readable storage medium on a client having instructions stored thereon, which when executed by a processor cause the processor to perform a method, the method comprising:
reading a first address;
setting a first identifier to a first string,
setting a first encryption code to a second string, and
establishing a first connection with a server wherein the first connection uses the first string as a first connection identifier and uses the second string as a first connection encryption code;
sending the first address to the server;
receiving a second address from the server;
forming a third identifier in the client from a portion of the first address and a portion of the second address, wherein both the portion of the first address and the portion of the second address are not null;
establishing a second connection with the server wherein the second connection uses the third identifier as a second connection identifier and uses the second string as a second connection encryption code.

22. A machine-readable storage medium on a server having instructions stored thereon, which when executed by a processor cause the processor to perform a method, the method comprising:
reading a first address;
setting a first identifier to a first string;
setting a first encryption code to a second string;
establishing a first connection with a client wherein the first connection uses the first string as a first connection identifier and uses the second string as a first connection encryption code;
sending the first address to the client;
receiving a second address from the client;
forming a third identifier in the server from a portion of the first address and a portion of the second address, wherein both the portion of the first address and the portion of the second address are not null; and establishing a second connection with the client wherein the second connection uses the third identifier as a second connection identifier and uses the second string as a second connection encryption code.

23. A system comprising:

means for establishing a first secure connection between a first device and a second device in the absence of information which identifies the first device or the second device;

means for exchanging identifying information between the first device and the second device; and means for establishing a second secure connection between the first device and the second device, wherein the second secure connection is a unique connection, and wherein establishing a second secure connection between the first device and the second device comprises forming a network identifier in the first device from a portion of the first identifying information and a portion of the second identifying information, wherein both the portion of the first identifying information and the portion of the second identifying information are not null;

forming the network identifier in the second device from the portion of the first identifying information and a portion of the second identifying information;

establishing a second connection between the first device and the second device wherein the second connection uses the network identifier as a second connection identifier and uses a common string as a second connection encryption code.

24. A system comprising:

in a first device having a first address;
    means for setting a first identifier to a first string,
    means for setting a first encryption code to a second string, and in a second device having a second address;
    means for setting a second identifier to the first string,
    means for setting a second encryption code to the second string, and
    means for establishing a first connection between the first device and the second device wherein the first connection uses the first string as a first connection identifier and uses the second string as a first connection encryption code;

means for transferring the first address from the first device to the second device;

means for transferring the second address from the second device to the first device;

means for forming a third identifier in the first device from a portion of the first address and a portion of the second address, wherein both the portion of the first address and the portion of the second address are not null;

means for forming the third identifier in the second device from the portion of the first address and the portion of the second address;

means for establishing a second connection between the first device and the second device wherein the second connection uses the third identifier as a second connection identifier and uses the second string as a second connection encryption code.

\* \* \* \* \*

UNITED STATES PATENT AND TRADEMARK OFFICE
CERTIFICATE OF CORRECTION

PATENT NO. : 7,660,420 B1 Page 1 of 1
APPLICATION NO. : 10/936890
DATED : February 9, 2010
INVENTOR(S) : Narayan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-eighth Day of December, 2010

David J. Kappos
*Director of the United States Patent and Trademark Office*